United States Patent Office 3,418,857
Patented Dec. 31, 1968

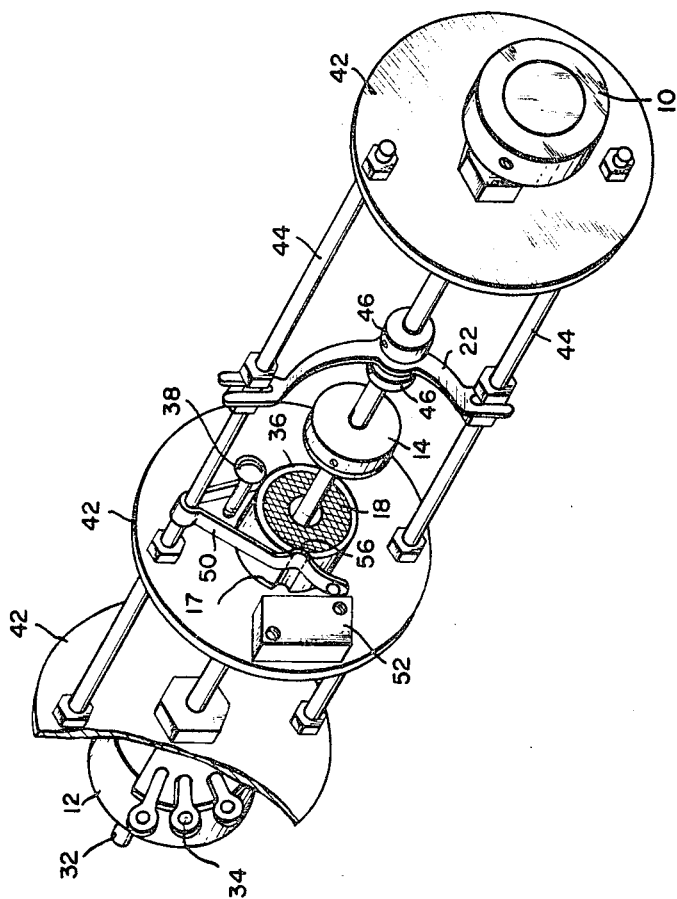

3,418,857
REFERENCE MECHANISM FOR A SHAFT-MOUNTED ROTATABLE ELEMENT
Frederick A. Klein, Vista, Calif., assignor to Hughes Aircraft Company, Culver City, Calif., a corporation of Delaware
Filed Oct. 3, 1966, Ser. No. 583,600
12 Claims. (Cl. 74—10)

ABSTRACT OF THE DISCLOSURE

A calibrating mechanism for establishing an angular reference point for a shaft-mounted rotatable element such as a control device. The mechanism comprises a rotatable shaft to which such element is attached. The shaft may be moved in a direction along its longitudinal axis to engage a pair of friction clutch members. A reference body having a detent slot on its periphery is mounted coaxially of the shaft so that rotation of the shaft when the clutch is engaged causes rotation of the reference body. A movable detent spring is positioned for engagement with the slot once during each complete revolution of the shaft to furnish an indication thereof, for example, by operating a limit switch to turn on an electric light. The reference body is independently rotatable whereby the slot may be positioned so as to engage the spring prior to engaging the clutch members to thus establish an angular reference point.

---

This invention relates to a reference mechanism and more particularly to a mechanism for establishing an angular reference point for a shaft-mounted rotatable element.

Control elements for electrical instrumentation, such as the sensitivity control of an oscilloscope preamplifier conventionally consist of two potentiometers, a switch element and associated manual controls. In these elements, one potentiometer is for varying the sensitivity continuously and the other potentiometer is for setting the sensitivity calibration when the continuously variable control is switched out. Thus, such control included two separate rotary control devices, one to establish the reference and the other to provide a continuously variable control and a switch to shift from one device to the other.

Therefore, it is an object of the present invention to provide an improved reference mechanism for a shaft-mounted rotatable element.

It is a further object of the present invention to provide an improved reference mechanism for a shaft-mounted rotatable element which cooperates with the rotatable element to provide a simplified method of establishing a reference position for said element.

A still further object of the present invention is to provide an improved reference mechanism for a shaft-mounted rotatable element which eliminates the necessity of having a second rotatable element for calibration.

The above, and other objects of this invention are accomplished in one embodiment of the present invention comprising a first clutch member affixed to the movable shaft of a rotatable element, a second clutch member in juxtaposition with said first clutch member and independently rotatable about said shaft, and a reference member operatively associated with said second clutch member. The clutch members are engageable upon axial movement of said shaft in one direction and when in engagement rotational movement of the shaft results in movement of the reference member. The sequence of operation comprises first positioning the reference member in a predetermined angular location through the engagement of the clutch members and rotation of the shaft and then establishing a reference value for this position by separating the clutch members and rotating the shaft until the desired value is observed. Further rotation of the shaft with the clutch members engaged will identify an angular reference point during each revolution of the shaft.

Other objects, features and advantages of this invention will become apparent from reading the following detailed description of one embodiment of the present invention and referring to the accompanying drawings in which:

FIG. 3 is a perspective view of a typical embodiment of the principal features of the present invention shown partly cut away to illustrate more clearly the elements of this embodiment.

Figure 1:
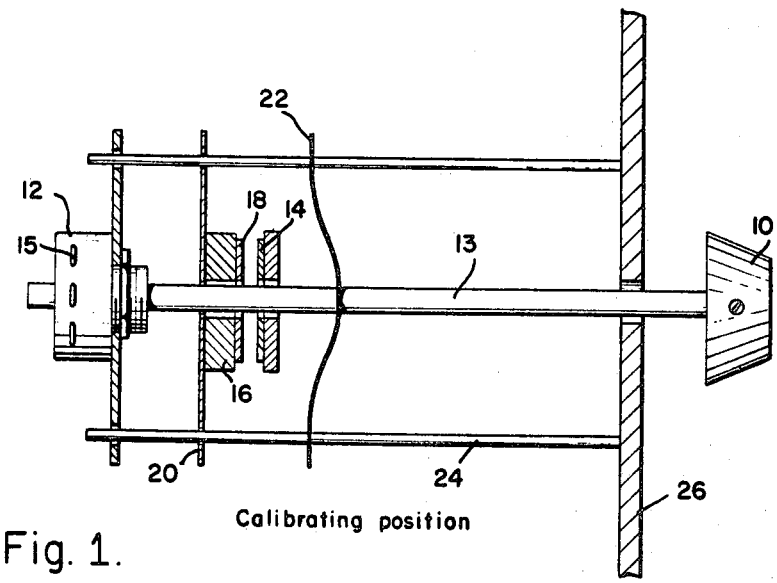
FIG. 1 is a schematic drawing of the principle elements of the present reference mechanism showing the control in a calibration or reference position.
Figure 2:
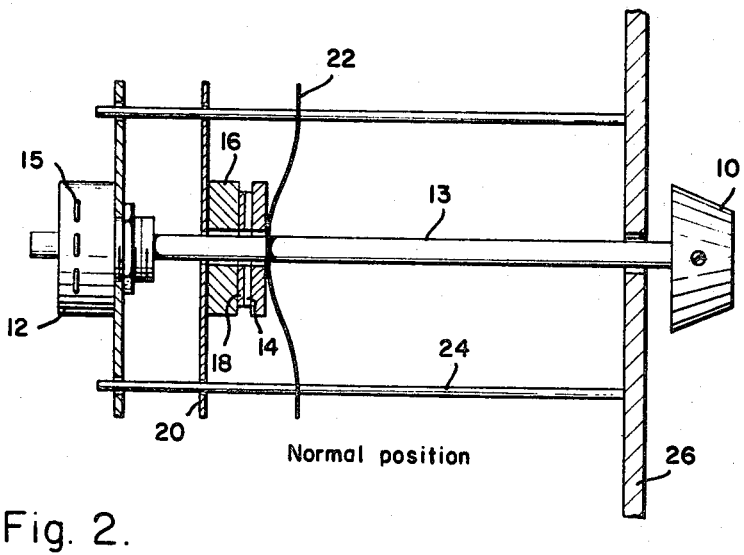
FIG. 2 is a schematic drawing similar to FIG. 1; however, in this figure the mechanism is shown in a normal or operating position.

Referring now to FIGS. 1 and 2, the principal features of the present invention are embodied in four basic elements, a control handle or knob 10, a control device 12, such as an electrical potentiometer having terminals 15 and an axially movable and rotatable shaft 13, a first clutch member 14 affixed to the shaft, a reference member 16 having a reference point, slot or detent 17 (shown in FIG. 3) and a second clutch member 18 on the end of the reference member 16 opposing the first clutch member 14. The reference member 16 is supported by a plate 20 so that it may be independently rotated as well as, when desired, rotated with the first clutch member 14 and the shaft 13. A retaining member 22 such as a leaf spring may be associated with the four primary elements to enhance the engagement of the two clutch members 14, 18. Typically, the basic elements are arranged as illustrated in FIG. 1 and are mounted to a support frame 24 which may include a front plate or instrument panel 26.

As shown in FIG. 1, when the mechanism is in the calibration position, the control handle or knob 10 is moved to the right or away from the panel 26, causing the shaft 13 to move in this direction and the first clutch member 14 to disengage the second clutch member 18. When in this position, rotations of the knob 10 rotate the shaft 13 and correspondingly varies the electrical condition of the device 12 without rotating the second clutch member 18 and the reference member 16.

To calibrate the control device, the reference member 16 is first rotated by engaging the two clutch members 14 and 18 and rotating the knob 10 and correspondingly the shaft 13 to a position corresponding to a predetermined location of the reference point 17 such as that which would actuate an external indicator such as a limit switch and light (not shown). Then the clutch members 14, 18 are released as shown in FIG. 1 by moving the shaft 13 to the right and the shaft is rotated until the control quantity reaches the desired level for the desired calibration. At this point, the clutch members 14, 18 are again engaged by moving the knob and shaft to the left as shown in FIG. 2.

A fixed value for a specific angular position of the knob, and, correspondingly, the shaft has now been established, and as shown in FIG. 2, additional rotations of the shaft during standard operation of the device causes the second clutch member and detent to rotate and identifies a reference point during each revolution of the shaft.

Shown in FIG. 3 is one embodiment of the primary elements of the invention as shown schematically in FIGS. 1 and 2. In this figure the control device 12 has been shown as a conventional electrical potentiometer having an axially movable shaft 32 and a plurality of electrical terminals 34 for coupling the potentiometer to an electrical circuit (not shown). The shaft 32 is of a length to enable a detenting device 36, the first clutch member 14, and the retaining spring 22 to be conveniently positioned along its length and to contain at the exposed end the control knob 10. The detenting device 36 is freely rotatable about the shaft 13 such as by mounting it on roller bearings (not shown), and is restrained from axial movement along the shaft by a screw and lock nut 38 engaging its periphery. The screw and lock nut 38 is shown affixed to a support plate or disc 42 forming part of a conventional mounting structure, including wafer discs 42, and connecting shafts 44 affixed thereto. The detenting device 36 may be of many shapes and is shown in FIG. 2 as cylindrical having on its exposed surface the second clutch member 18 and on its periphery the reference point 17 in the form of a transverse slot. The first clutch member 14 and the second clutch member 18 are of a grippable, resilient material such as rubber or abestos.

The retaining device 22 is a leaf spring, supported by the connecting shafts 44 and is positioned outwardly from the first clutch member by a pair of retaining discs 46 affixed to the shaft 32. Longitudinal movement of the shaft 32 causes the retaining device 22 to spring from a first position to enhance the engament of the clutch members when the shaft 32 is moved to the left as shown in FIG. 3.

If desired, for indication of the movement of the control device to the fixed or calibration position, the arm of a spring 50 rides on the surface of the detenting device 36 and engages the switch lever of a conventional limit switch 52. The switch 52 is so positioned relative to the spring that when the slot 17 is engaged by a raised portion 56 on the spring, it will be actuated to operate an indicating device such as an electric light (not shown) to indicate the predetermined calibrated position.

What is claimed is:
1. In a mechanism for establishing an angular reference point for a shaft-mounted rotatable element the combination of:
   a rotatable driveable shaft mounted for rotation about its longitudinal axis and adapted to have such element mounted thereon for rotation therewith,
   a friction clutch,
   said friction clutch comprising a first clutch member secured to said shaft for movement therewith and a second clutch member cooperating with said first clutch member,
   means for accommodating longitudinal movement of said shaft whereby opposing surfaces of said clutch members may be engaged and disengaged,
   a reference body having a segment defining an angular reference point and being mounted for rotation whereby said segment may be moved through a circular arc path,
   a movable member positioned in said path for engagement with said segment at a point in said path,
   said movable member upon engagement with said segment moving from a normal position to provide an indication of the angular position of said segment,
   said reference body being freely and independently rotatable when said clutch surfaces are disengaged to produce engagement of said segment with said movable member and said body also being rotatable by said shaft when said clutch surfaces are engaged,
   said clutch surfaces being engageable and disengageable solely by moving said shaft along it longitudinal axis irrespective of the respective angular positions of said shaft and of said segment whereby initial engagement of said clutch surfaces establishes an angular reference point.

2. In the mechanism of claim 1 the shaft-mounted rotatable element being mounted on said shaft.

3. In the mechanism of claim 1 wherein said reference body is mounted coaxially of said shaft and is supported thereby.

4. In the mechanism of claim 1 further including a retaining member coupled to said shaft and operable after engagement of said clutch surfaces to enhance the engagement therebetween.

5. In the mechanism of claim 4 wherein said retaining member is a spring operable to maintain said clutch surfaces in or out of engagement.

6. In the mechanism of claim 4 wherein the retaining member is a leaf spring.

7. In the mechanism of claim 1 wherein the surface of said second clutch member is defined by a layer of grippable resilient material.

8. In the mechanism of claim 1 further comprising a limit switch operable upon movement of said movable member.

9. In the mechanism of claim 1 wherein said segment and said movable member comprise a detent arrangement for releasably locking said reference body against rotation when said segment and said movable member are engaged.

10. In the mechanism of claim 1 wherein said segment is defined by a slot disposed on the periphery of said reference body.

11. In the mechanism of claim 10 wherein said movable member is a pivoted spring having a shaped portion for engaging said slot.

12. In a mechanism for establishing an angular reference point for a shaft-mounted rotatable element the combination of:
   a rotatable driveable shaft mounted for rotation about its longitudinal axis and adapted to have such element mounted thereon for rotation therewith,
   a fraction clutch,
   said friction clutch comprising a first disc shaped clutch member secured to said shaft and a second clutch member cooperating with said first clutch member,
   means for accommodating longitudinal movement of said shaft whereby said clutch members may be engaged or disengaged,
   a rotatable reference disc having a peripheral slot secured to said second clutch member,
   a detent spring adapted to engage said slot once during each complete revolution of said reference disc to provide an indication of the angular position of said reference disc,
   said clutch members and said reference disc being disposed coaxially of said shaft,
   said reference disc being freely and independently rotatable when said clutch members are disengaged and also being rotatable by said shaft when said clutch surfaces are engaged, and said clutch members being engageable irrespective of the respective angular positions of said clutch members whereby initial engagement of said clutch members establishes an angular reference point for subsequent rotation of said shaft.

References Cited

UNITED STATES PATENTS 2,501,386  3/1950  Gibbs _____ 192—34 X
3,090,932  5/1963  Torrence _____ 24—10.45 X MILTON KAUFMAN, *Primary Examiner.*

U.S. Cl. X.R.

74—504; 192—95